US011220028B1

(12) United States Patent
Cardenas et al.

(10) Patent No.: US 11,220,028 B1
(45) Date of Patent: Jan. 11, 2022

(54) METHOD OF MANUFACTURE FOR THIN, MULTI-BEND OPTICS BY COMPRESSION MOLDING

(71) Applicant: Facebook Technologies, LLC, Menlo Park, CA (US)

(72) Inventors: Nelson Cardenas, Seattle, WA (US); Yusufu Njoni Bamaxam Sulai, Bothell, WA (US); Alexander Sohn, Seattle, WA (US); Jacques Gollier, Redmond, WA (US); Kurt Jenkins, Sammamish, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 387 days.

(21) Appl. No.: 15/916,100

(22) Filed: Mar. 8, 2018

(51) Int. Cl.
| | |
|---|---|
| *B29C 43/36* | (2006.01) |
| *B29C 43/02* | (2006.01) |
| *B29C 43/52* | (2006.01) |
| *B29K 33/00* | (2006.01) |
| *B29K 69/00* | (2006.01) |
| *B29K 105/00* | (2006.01) |
| *B29L 11/00* | (2006.01) |
| *B29C 43/56* | (2006.01) |

(52) U.S. Cl.
CPC .............. *B29C 43/36* (2013.01); *B29C 43/02* (2013.01); *B29C 43/52* (2013.01); *B29C 43/56* (2013.01); *B29C 2043/563* (2013.01); *B29K 2033/12* (2013.01); *B29K 2069/00* (2013.01); *B29K 2105/256* (2013.01); *B29L 2011/00* (2013.01)

(58) Field of Classification Search
None
See application file for complete search history.

(56) References Cited

U.S. PATENT DOCUMENTS

| | | | | |
|---|---|---|---|---|
| 3,632,841 | A | * | 1/1972 | Fortin ..................... B29C 67/00 264/1.6 |
| 3,810,815 | A | * | 5/1974 | Welhart et al. ... B32B 17/10009 428/412 |
| 3,914,608 | A | | 10/1975 | Malmberg |

(Continued)

OTHER PUBLICATIONS

Brydson's Plastics Materials (8th Edition, 2016), Table 17.6.*

(Continued)

*Primary Examiner* — Matthew J Daniels
*Assistant Examiner* — Paul Spiel
(74) *Attorney, Agent, or Firm* — Weaver Austin Villeneuve & Sampson LLP

(57) ABSTRACT

A method for manufacturing thin, multi-bend optics includes placing an optical substrate and a protective sheet into a compression mold and closing the compression mold to deform the optical substrate and to deform the protective sheet. The optical substrate can include an optical surface and the protective sheet can be disposed between the compression mold and the optical surface of the optical substrate. The compression mold can include a mold contact surface that is characterized by a surface roughness. The compression mold can be held in a closed position for a compression time period, during which, the protective sheet contacts the mold contact surface and provides a buffer layer between the mold contact surface and the optical surface thereby mitigating against transfer of the surface roughness of the mold contact surface onto the optical surface.

9 Claims, 8 Drawing Sheets

(56) References Cited

U.S. PATENT DOCUMENTS

| | | | |
|---|---|---|---|
| 4,163,155 A | | 7/1979 | Alles et al. |
| 4,231,827 A | * | 11/1980 | Wilson ................... B29C 59/02 |
| | | | 156/214 |
| 4,504,341 A | | 3/1985 | Radzwill et al. |
| 4,540,532 A | * | 9/1985 | Petcen ................ B29C 33/0038 |
| | | | 264/1.1 |
| 4,753,847 A | * | 6/1988 | Wilheim ................. B29C 33/62 |
| | | | 428/411.1 |
| 5,694,230 A | | 12/1997 | Welch |
| 5,799,231 A | | 8/1998 | Gates et al. |
| 5,876,902 A | | 3/1999 | Veneklasen et al. |
| 6,387,484 B1 | * | 5/2002 | Ghiam ................ B29C 63/0017 |
| | | | 428/343 |
| 6,720,565 B2 | | 4/2004 | Innes et al. |
| 6,812,471 B2 | | 11/2004 | Popiolkowski et al. |
| 7,176,471 B2 | | 2/2007 | Ito et al. |
| 7,663,124 B2 | | 2/2010 | Kasono et al. |
| 8,168,373 B2 | | 5/2012 | Shew |
| 8,614,052 B2 | | 12/2013 | Galler |
| 8,975,601 B1 | | 3/2015 | Chen |
| 9,378,926 B2 | | 6/2016 | Kuo et al. |
| 9,690,208 B2 | | 6/2017 | Yu |
| 2001/0028039 A1 | | 10/2001 | Plontke et al. |
| 2002/0146627 A1 | | 10/2002 | Suleski et al. |
| 2003/0007444 A1 | | 1/2003 | Tsukuda et al. |
| 2003/0077039 A1 | | 4/2003 | Kurihara et al. |
| 2003/0132536 A1 | | 7/2003 | Zhen et al. |
| 2004/0091642 A1 | | 5/2004 | Murakami et al. |
| 2004/0222537 A1 | * | 11/2004 | Sidhu ................ B29D 11/0073 |
| | | | 264/1.31 |
| 2005/0035308 A1 | | 2/2005 | Javer et al. |
| 2005/0046957 A1 | | 3/2005 | Lai et al. |
| 2005/0053789 A1 | * | 3/2005 | Percival .................. B29C 51/28 |
| | | | 428/413 |
| 2005/0151284 A1 | | 6/2005 | Soeno |
| 2006/0108542 A1 | | 5/2006 | Ito et al. |
| 2006/0110116 A1 | | 5/2006 | Sakai et al. |
| 2006/0115745 A1 | | 6/2006 | Yasuda et al. |
| 2006/0121396 A1 | | 6/2006 | Gauglitz et al. |
| 2006/0124869 A1 | | 6/2006 | Yoneyama et al. |
| 2007/0160336 A1 | | 7/2007 | Sakai et al. |
| 2008/0026258 A1 | | 1/2008 | Okino et al. |
| 2008/0094694 A1 | | 4/2008 | Yun et al. |
| 2008/0197295 A1 | | 8/2008 | Kaule et al. |
| 2008/0237460 A1 | | 10/2008 | Fragner et al. |
| 2009/0123870 A1 | | 5/2009 | Usa et al. |
| 2009/0134340 A1 | | 5/2009 | Furuhashi et al. |
| 2009/0166553 A1 | | 7/2009 | Okino |
| 2009/0230328 A1 | | 9/2009 | Komatsu et al. |
| 2010/0237262 A1 | | 9/2010 | Usa et al. |
| 2010/0277803 A1 | | 11/2010 | Pockett et al. |
| 2011/0255388 A1 | | 10/2011 | Goshima et al. |
| 2013/0027683 A1 | | 1/2013 | Yamashita |
| 2013/0058370 A1 | | 3/2013 | Chang-Hasnain et al. |
| 2013/0127980 A1 | * | 5/2013 | Haddick ............ G02B 27/0093 |
| | | | 348/14.08 |
| 2013/0183015 A1 | | 7/2013 | Mori et al. |
| 2014/0252228 A1 | | 9/2014 | McMorran et al. |
| 2015/0344353 A1 | | 12/2015 | Han et al. |
| 2017/0243718 A1 | | 8/2017 | Motosugi |
| 2018/0036922 A1 | | 2/2018 | Walters et al. |
| 2018/0059297 A1 | | 3/2018 | Peroz et al. |
| 2018/0059304 A1 | | 3/2018 | Bhargava et al. |
| 2018/0095201 A1 | | 4/2018 | Melli et al. |

OTHER PUBLICATIONS

Pilkey, Walter D.. (2005). Formulas for Stress, Strain, and Structural Matrices (2nd Edition)—Tables for Chapter 4. (pp. 218). John Wiley & Sons. Retrieved from https://app.knovel.com/hotlink/pdf/id:kt003ZLF55/formulas-stress-strain/tables-for-chapter-4 (Year: 2005).*

"Blazed grating", retrieved from https://en.wikipedia.org/wiki/Blazed_grating, Dec. 26, 2016 and printed on Feb. 10, 2017.

"Electron-beam lithography", retrieved from https://en.wikipedia.org/wiki/Electron-beam_lithography, Sep. 12, 2017 and printed on Feb. 10, 2017.

"Grayscale Lithography", retrieved from http://www.eng.auburn.edu/~sylee/gray.html, Sep. 30, 2017 and printed on Oct. 29, 2018.

"Optical Components", retrieved from https://microdevices.jpl.nasa.gov/capabilities/optical-components/process-for-3-d-surface-relief-profiles.php printed on Feb. 10, 2017.

"Stitch-free Lithography", retrieved from https://www.raith.com/technology/stitch-free-lithography.html, 2017 printed on Feb. 10, 2017.

U.S. Appl. No. 15/713,419, "Restriction Requirement", dated Dec. 18, 2018, 7 pages.

Kirchner, et al., "ZEP520A—A Resist for Electron-Beam Grayscale Lithography and Thermal Reflow", Microelectronic Engineering, vol. 153, Mar. 5, 2016, pp. 71-76.

NIST, "New Grayscale Technique Opens a Third Dimension for Nanoscale Lithography", retrieved from https://www.nist.gov/news-events/news/2013/08/new-grayscale-technique-opens-third-dimension-nanoscale-lithography, Aug. 28, 2013 and printed on Feb. 10, 2017.

Yu, et al., "The evaluation of photo/e-beam complementary grayscale lithography for high topography 3D structure", Proc. SPIE 8682, Advances in Resist Materials and Processing Technology XXX, 868212, retrieved from at: http://proceedings.spiedigitallibrary.org/proceeding.aspx?articleid=1674320, Mar. 29, 2013 and printed on Feb. 10, 2017.

U.S. Appl. No. 15/713,419, "Non-Final Office Action", dated Mar. 6, 2019, 22 pages.

Kristjansson, et al., "Circular Grating Coupled DBR Laser with Integrated Focusing Outcoupler", IEEE Photonics Technology Letters, vol. 9, No. 4, Apr. 1997, 3 pages.

U.S. Appl. No. 15/788,756, "Final Office Action", dated Nov. 27, 2019, 8 pages.

U.S. Appl. No. 15/713,419, Final Office Action dated Jul. 5, 2019, 14 pages.

U.S. Appl. No. 15/713,419, Notice of Allowance dated Sep. 17, 2019, 14 pages.

U.S. Appl. No. 15/788,756, Non-Final Office Action dated May 16, 2019, 8 pages.

U.S. Appl. No. 15/878,227, Non-Final Office Action dated Aug. 29, 2019, 14 pages.

Steingruber et al., Continuously Chirped Gratings for DFB-lasers Fabricated by Direct Write Electron-Beam Lithography, Microelectronic Engineering, vol. 61-62, Jul. 2002, pp. 331-335.

U.S. Office Action dated Feb. 20, 2020, in U.S. Appl. No. 15/916,104.

U.S. Final Office Action dated May 19, 2020, in U.S. Appl. No. 15/916,104.

U.S. Office Action dated Aug. 28, 2020, in U.S. Appl. No. 15/916,104.

U.S. Appl. No. 15/916,104, filed Mar. 8, 2018, Cardenas et al.

U.S. Final Office Action dated Dec. 18, 2020 in U.S. Appl. No. 15/916,104.

U.S. Advisory Action dated Mar. 2, 2021 in U.S. Appl. No. 15/916,104.

Screen captures from "Bending Plexiglass," Youtube.com, Oct. 9, 2011, https://www.youtube.com/watch?v=PlzyzlsgHS4 (accessed Dec. 1, 2020) (Year: 2011).

* cited by examiner

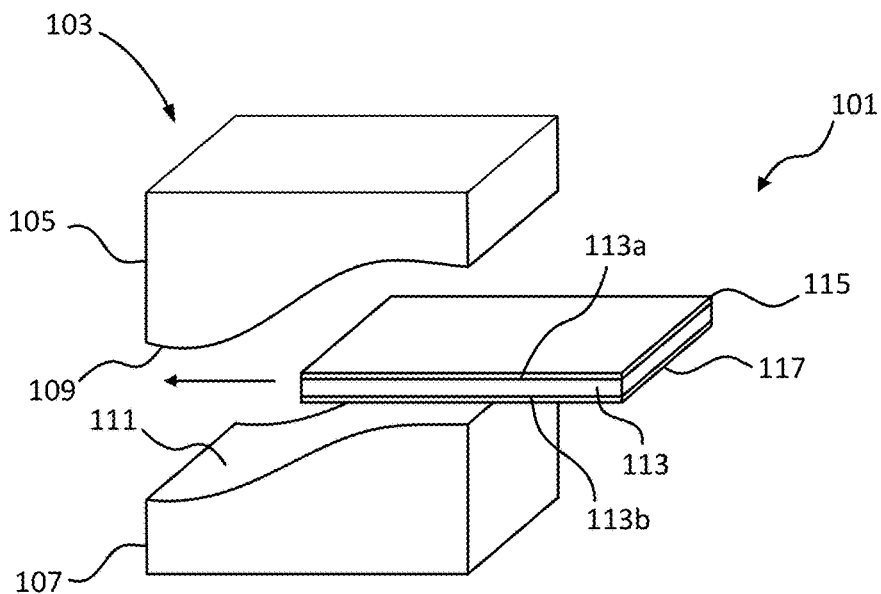
FIG. 1A
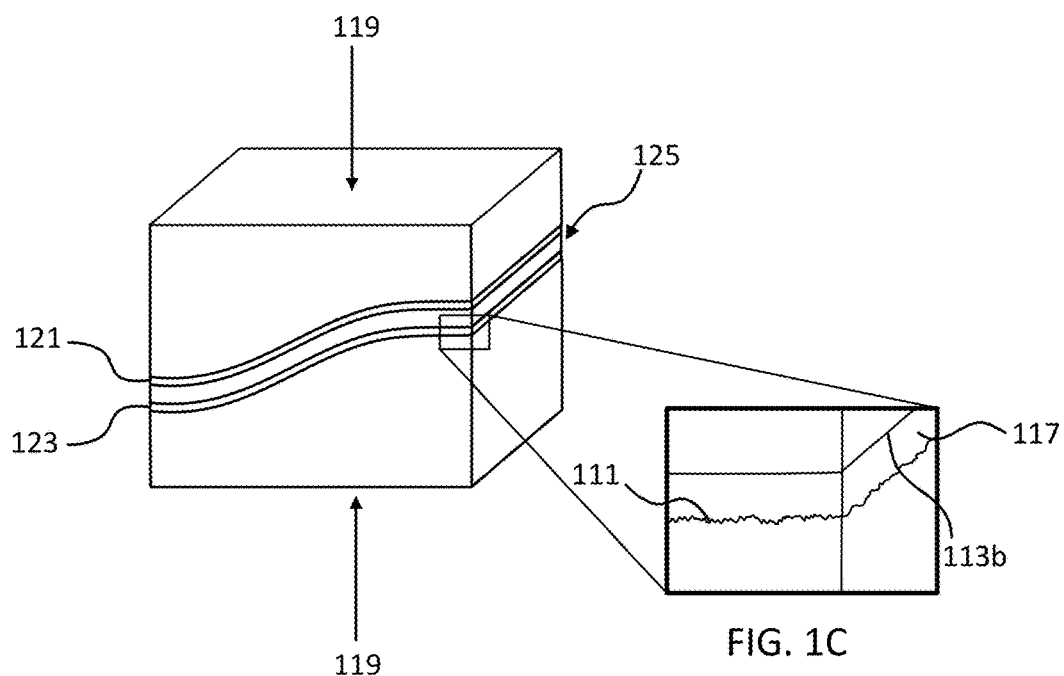
FIG. 1B
FIG. 1C
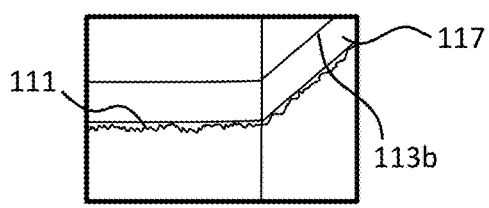
FIG. 1D

METHOD OF MANUFACTURE FOR THIN, MULTI-BEND OPTICS BY COMPRESSION MOLDING

BACKGROUND

Traditional manufacturing methods suffer from a number of issues when used to manufacture thin optical elements having multiple bends. Furthermore, if the optic does not possess rotational symmetry, standard processes such as diamond turning are not suitable. Once challenge for standard processes is that they cannot handle a change in the sign of the radius of curvature across the part. Conventional methods such as diamond turning also struggle to handle thin optical elements, i.e., elements that have a high length/width-to-thickness ratio. Injection molding of such parts is also problematic because in many cases the finished part must have highly polished, specular surfaces (optical quality surfaces). To provide this level of surface finish, mold inserts with highly polished, specular surfaces are usually employed which can lead to increased cost and complexity. This is because the mold inserts must be manufactured separately from the molds and must be inserted or removed from the molds as part of the manufacturing process. In addition, the high aspect ratio of a thin optical element can make injection molding challenging or impossible. Accordingly, there remains a need for improved methods of manufacture for thin optical elements having multiple bends of arbitrary shape and radius of curvature.

SUMMARY

The present disclosure generally relates to systems and methods for the manufacture of thin, multi-bend optical elements.

In some embodiments, a method includes placing an optical substrate and a protective sheet into a compression mold. The optical substrate can include an optical surface and the protective sheet can be disposed between the compression mold and the optical surface of the optical substrate. The compression mold can include a mold contact surface that is characterized by a surface roughness. The method further includes closing the compression mold to deform the optical substrate and to deform the protective sheet and holding the compression mold in a closed position for a compression time period. During the compression time period, the protective sheet can contacts the mold contact surface and provides a buffer layer between the mold contact surface and the optical surface thereby mitigating against transfer of the surface roughness of the mold contact surface onto the optical surface. The method can further include opening the compression mold and removing the optical substrate and protective sheet from the compression mold.

In some embodiments, the method can further include, before placing the optical substrate and a protective sheet into the compression mold, placing the protective sheet on the optical surface of the optical substrate to form an optical element preform.

In some embodiments, placing the optical substrate and protective sheet into the compression mold can include placing an optical element preform into the compression mold, with the optical element preform including the optical substrate having the protective sheet disposed on the optical surface.

In some embodiments, the mold contact surface can be a non-specular surface and the optical surface of the optical substrate after being removed from the compression mold can be maintained as a specular surface. For example, a surface roughness of the optical surface of the optical substrate after being removed from the compression mold can be less than 5 nm RMS.

In some embodiments, the method can further include pre-heating the optical substrate before placing it in the compression mold.

In some embodiments, the method can further include indirectly heating the optical substrate by heating the compression mold.

In some embodiments, a glass temperature of the optical substrate can be lower than a glass temperature of the protective sheet. For example, a glass temperature of the optical substrate can be within a range of 100° C. to 110° C. and a glass temperature of the protective sheet can be between 140° C. to 150° C. In other embodiments, a glass temperature of the optical substrate can be within a range of 80° C. to 170° C.

In some embodiments, a bent optical element is described with the bent optical element being formed using any of the methods disclosed herein.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIGS. 1A-1G illustrate a system for manufacture of thin, multi-bend optics by compression molding according to certain embodiments;

DETAILED DESCRIPTION

Figure 1E:
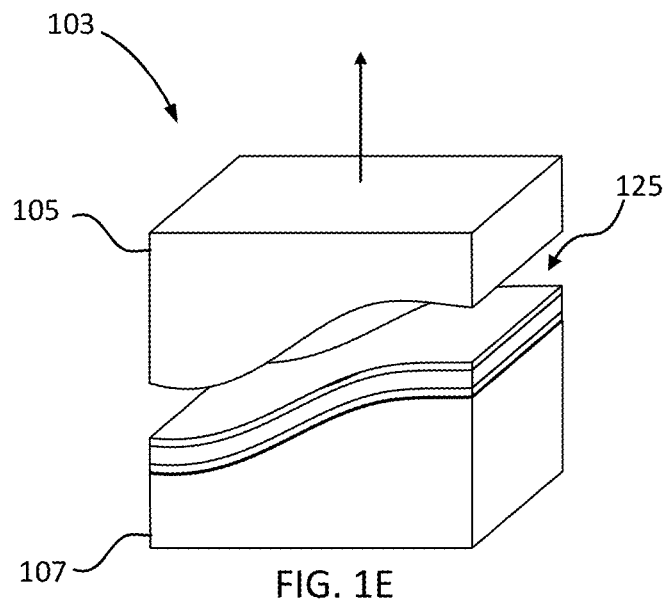

One or more embodiments provide systems and methods for manufacturing multi-bend optical elements. More specifically, the systems and methods provide for a simplified and lower cost method for the manufacture of multi-bend optical elements having specular surfaces. According to certain embodiments, molds and/or vacuum parts having non-specular contact surfaces can be employed to mold optical elements requiring specular surfaces because the optical element preform includes an optical substrate initially having specular surfaces that is sandwiched between one or more protective sheets before the bending process commences. According to certain embodiments, the glass transition temperature of the protective sheets is higher than the glass transition temperature of the optical substrate. Because, the manufacturing process proceeds at a temperature that is less than the glass transition temperature of the protective sheets, the protective sheets retain enough rigidity to serve as buffer layers that protect the specular surfaces of the optical substrate from any roughness that may be present on the surface of the mold/vacuum part.

The method is advantageous to traditional techniques for forming multi-bend optics because highly polished mold/vacuum part surfaces are not necessary. Rather, the surfaces of the mold/vacuum part that contact the optical element preform can be unpolished surfaces, as would be the case for mechanically milled metal surfaces that have not been processed other than the rough milling process that is used to creating the overall surface contours of the mold. Accordingly, the systems and techniques disclosed herein eliminate the need to apply costly and time consuming polishing techniques to the mold/vacuum part surfaces and also eliminates the need to use costly, pre-polished mold inserts.

FIG. 1A illustrates a system for manufacture of thin, multi-bend optics by compression molding according to certain embodiments. The system facilitates a compression molding process by which an optical substrate can be molded into a bent optical element while preserving the optical quality of the surfaces of the substrate. As used herein the term bent/bend refers to a shape that can include linear bends that can be defined by a bend axis that runs parallel to the bend, such as creases, folds, etc. and also includes three dimensional bends such as spherically, elliptically, or arbitrarily curved surfaces. The system includes a compression mold 103 made up of an upper mold portion 105 and a lower mold portion 107. Each mold portion includes a mold contact surface (109,107) that is unpolished and possesses an arbitrary surface shape that is based on the desired shape of the molded optical element. For example, upper mold contact surface 109 can be generally s-shaped in cross section and lower mold contact surface 111 can be generally s-shaped in cross section, with a complementary shape to upper mold contact surface. Due to their complementary shapes, when the mold portions are brought together during the compression process, a uniform compression force is applied over the entire area of an optical element preform 101 such that the optical element preform 101 is compressed into a thin multi-bend optical substrate having surfaces of optical quality. In some embodiments, the thin multi-bend optical substrate can have a thickness of about 0.5 mm, e.g., within the endpoint inclusive ranges of 0.1 mm to 2 mm, 0.1 mm to 1 mm, 0.1 mm to 0.5 mm, and/or 0.2 mm to 0.4 mm, but any thickness is possible without departing from the scope of the present disclosure. The upper mold contact surface 109 and lower mold contact surface 111 need not be of optical quality and instead can be generally rough, unpolished (i.e., non-specular) surfaces. For example, the mold contact surfaces can be totally unpolished surfaces, such as those that would result directly from a milling process. According to certain embodiments, the mold portions may be machined, e.g., milled, from aluminum stock, but any material can be used without departing from the scope of the present disclosure including, e.g., molding, casting, 3D printing, and the like.

According to certain embodiments, the optical element preform 101 can include an optical substrate 113, e.g., a thin, transparent optical material such as Polymethyl methacrylate (also referred to as PMMA or acrylic), polycarbonate (PC), or the like. The surfaces of optical substrate 113 are optical surfaces, i.e., upper optical surface 113a and lower optical surface 113b can be specular surfaces such that the substrate 113 can be used as an optical element (such as a mirror, window, beam splitter, polarizer, waveplate, and the like). The optical surfaces 113a and 113b of the optical element preform 101 can be protected during the compression process by upper protective sheet 115 and lower protective sheet 117. According to certain embodiments, the upper and lower protective sheets 115 and 117 can be formed from any material that has a higher glass transition temperature than the optical substrate 113. For example, if the optical substrate 113 is formed from acrylic, the protective sheets can be formed from PC. The protective sheets can be separate sheets that are unbonded to, and abutted against, the surfaces of the optical substrate 113. Additionally, the protective sheets can be bonded to the optical substrate in advance of the compression molding process, e.g., by some sort of adhesive or non-adhesive bonding process.

During the compression molding process, the upper mold portion 105 and lower mold portion 107 are pressed together by a compression force 119 as shown in FIG. 1B. The compression force 119 can be applied by any means or method. For example, lower mold portion 107 can be coupled to a stable platform (now shown) and upper mold portion 105 can be fixed to an actuator system as a piston or other mechanical device that allows for upper mold portion 105 to be moved into and out of engagement with the lower mold portion 107. During the compression molding process, the actuator system can provide a control over compression force 119 that is applied to the optical element preform 101. During the compression phase, the optical element preform 101 will form a deformed optical element 121 having a shape that corresponds to the shape of the upper and lower mold contact surfaces 109 and 111, respectively. For example, if the upper and lower mold contact surfaces mate to form a multi-bend s-shape, then the deformed optical element 121 will also form a multi-bend s-shape.

According to certain embodiments, the molding process can include heating the optical element preform, which can be accomplished any number of ways. For example, the optical substrate 113 can be preheated or the entire optical element preform 101 (including the upper protective sheet 115 and lower protective sheet 117) can be preheated before being inserted into the compression mold 103. In addition to being preheated, heat can be applied to the optical element preform 101 through radiation from, and/or contact with, a heated compression mold 103. According to certain embodiments, preheating may not be needed and the heating of the optical element preform 101 can be accomplished solely via radiation from, and/or contact with a heated compression mold 103. In some embodiments, the entire compression mold 103 can be placed in an oven to provide the heating. In other embodiments, one or more heating elements or heaters can be placed within one or more portions of the compression mold. Generally, the heating of the mold, protective sheets, and/or optical substrate can be accomplished by any means and, as such the examples described above are not intended to limit how heat is applied and/or maintained before, during, or after the molding process.

In some embodiments, during the molding process, the temperature of the optical element preform 101 can be held at a process temperature that is near to or approximately equal to the glass transition temperature of the optical substrate to facilitate bending of the substrate during the molding process. This process temperature can be chosen to also be below the glass transition temperature of the upper and lower protective sheets 115 and 117 such that, during molding, the optical substrate 113 will bend into position to match the overall surface shape of the upper mold contact surface 109 and lower mold contact surface 111 but the protective sheets will maintain enough rigidity to protect the surface of the optical substrate 113 from the rough surfaces of the mold portions. In such as case, the heat applied to the optical element preform may result in a process temperature that is high enough to allow for a plastic deformation of the upper and lower protective sheets, but not high enough to melt these sheets such that they lose their ability to protect the polished surfaces of the optical substrate. Accordingly, even under the temperature and pressures that are present during the compression molding process, the protective sheets serve as buffer layers 121 and 123 that protect the optical surfaces of the optical substrate from the rough surfaces of the mold. Such an arrangement mitigates, or even prevents, the transfer of any mold contact surface patterns or textures to the optical surfaces of the optical substrate during the molding process.

Depending on the choice of materials for the protective sheets 115 and 117 and also depending on the pressure and temperature applied during molding, the buffer layers can behave differently. FIG. 1C shows one situation where the temperature and pressure are high enough to allow for the stamping of the rough surface pattern of the mold contact surface 111 onto a protective surface of the protective sheet 117. FIG. 1D shows another example where the temperature and pressure are not high enough to allow the protective sheet 117 to be stamped by the mold contact surface. In either case, the protective sheet 117 serves as a sufficient buffer layer 123 that protects the optical surface 113b of the optical substrate 113 from the rough surface of the mold thereby preserving the optical surface quality of the optical substrate.

Figure 1F:
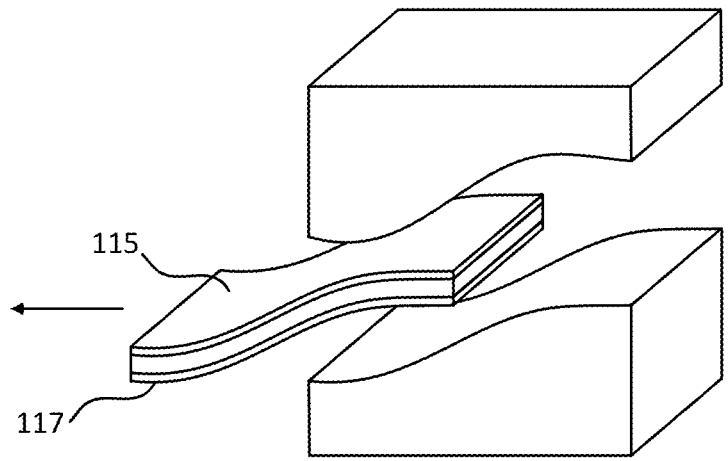

After a predetermined compression time period, the optical element preform 101 is plastically deformed into a deformed optical element 125 and the mold 103 is then re-opened, e.g., by raising the upper mold portion 105, as shown in FIG. 1E. In some examples, the mold 103 can be opened while the deformed optical element 125 is still hot and in other examples the mold 103 and deformed optical element 125 can be allowed to cool before the deformed optical element 125 is removed, as shown in FIG. 1F.

Advantageously, after being removed, the deformed optical element 125 is still protected by the protective sheets 115 and 117 and thus, as it is removed from the mold the risk of damage to the optical surfaces of the deformed optical element 125 will be reduced.

Figure 1G:
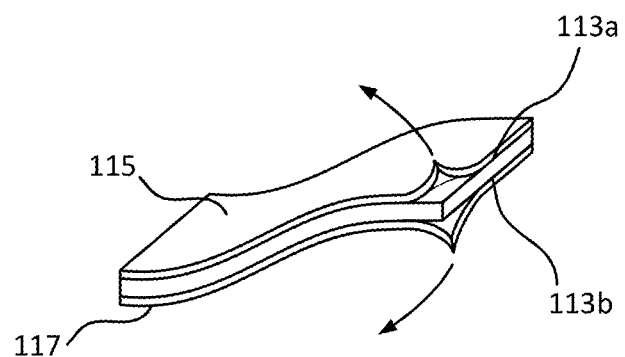

According to certain embodiments, deformed optical element 125 may already be a fully finished optical element, e.g., having received the requisite optical coatings and the like before the compression molding process. In some embodiments, the deformed optical element 125 may receive additional surface treatments. Before treating the optical surfaces of the deformed optical element 125, the protective sheets 115 and 117 can be removed, thereby revealing the undamaged optical surfaces of the now deformed optical substrate, as shown in FIG. 1G. Deformed optical substrates can be post-processed by any means to produce a final optical element. Examples of post-processing techniques include lamination, chemical vapor deposition, physical vapor deposition (such as Electron-Beam Physical Vapor Deposition), dip coating, spin coating, and the like.

Figure 2A:
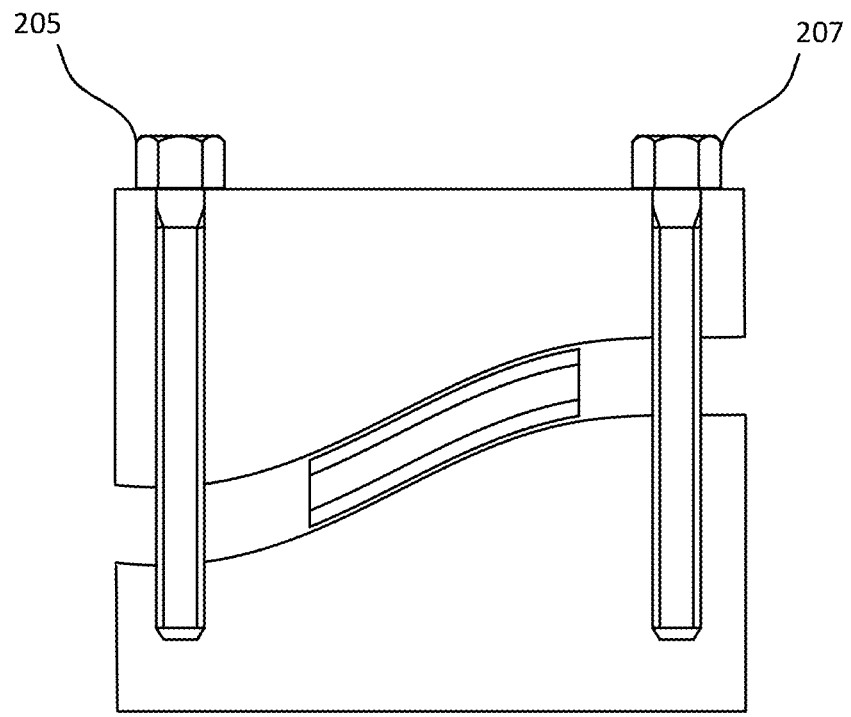
FIGS. 2A-2B illustrate a system for manufacture of thin, multi-bend optics by compression molding according to certain embodiments.
Figure 2B:
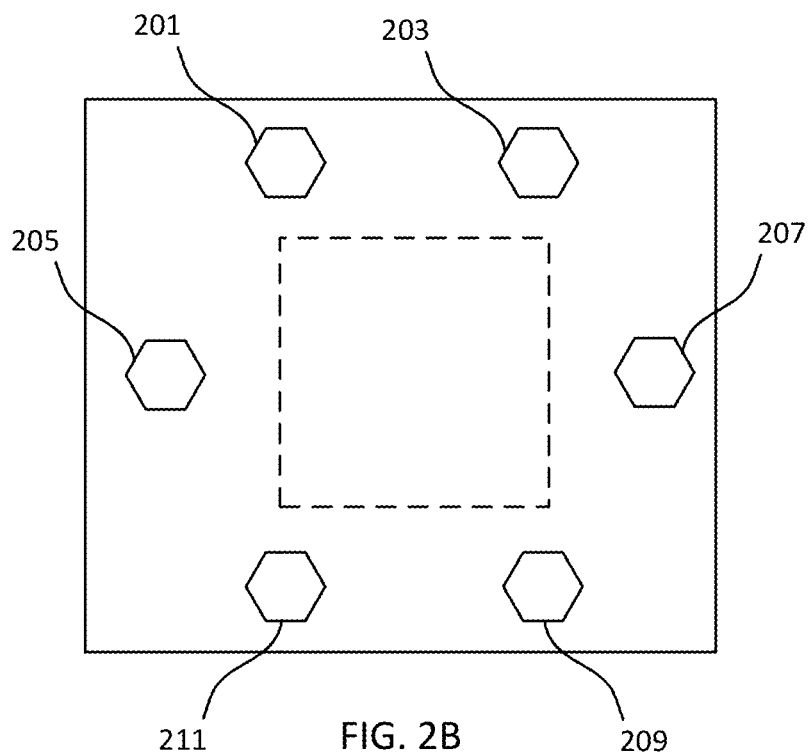

FIGS. 2A-2B illustrate a system for manufacture of thin, multi-bend optics by compression molding according to certain embodiments. This is system is similar to that already describe above in reference to FIGS. 1A-1G except that in this case, the compression force is applied by screws 201-210. As noted above, any method for producing a compression force between the mold portions can be employed without departing from the scope of the present disclosure.

Figure 3:
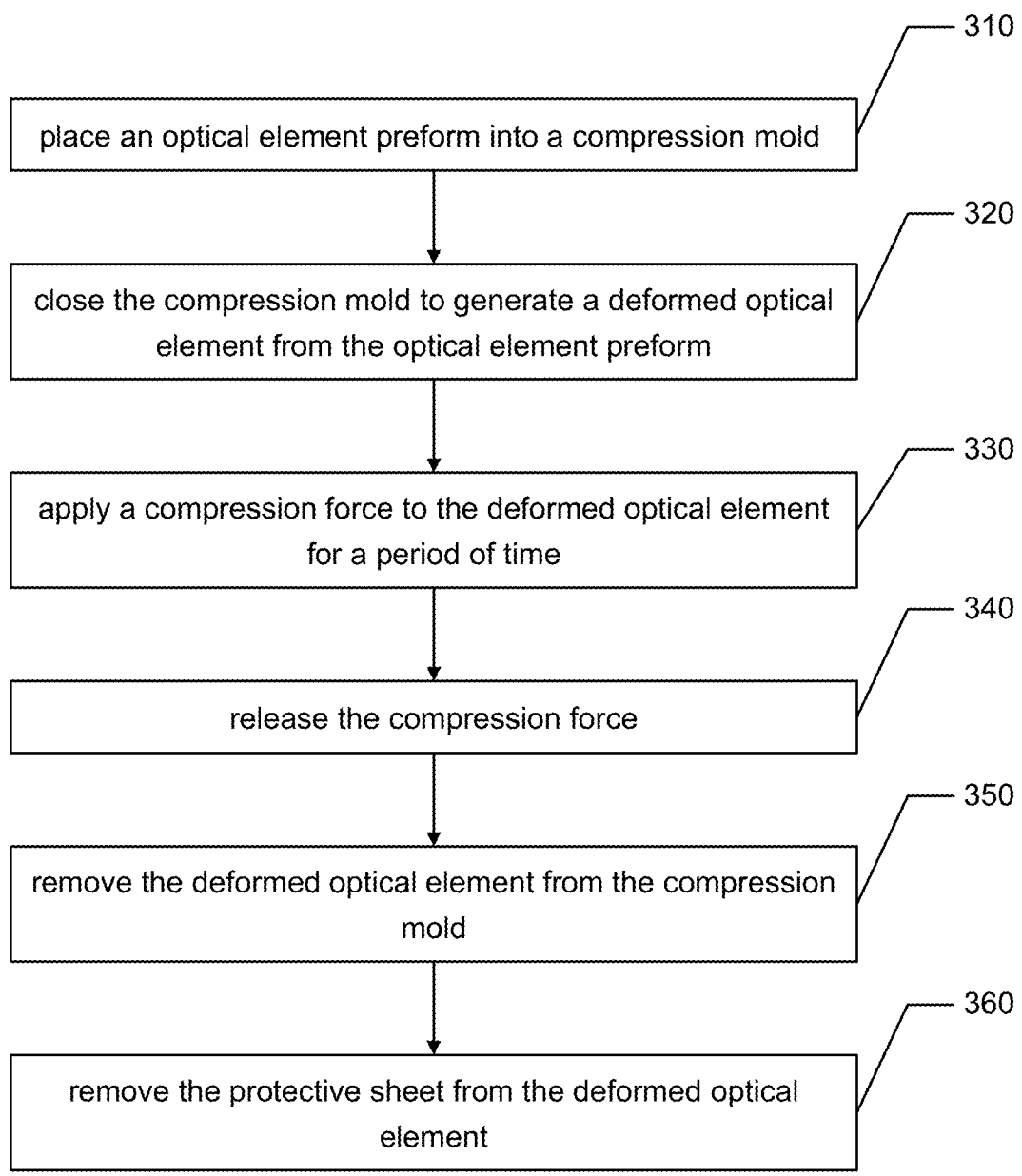
FIG. 3 illustrates a flow chart for a method of manufacturing thin, multi-bend optics by compression molding according to certain embodiments.

FIG. 3 illustrates a flow chart for a method of manufacturing thin, multi-bend optics by compression molding according to certain embodiments. The method can employ any of the compression molding systems described herein and their variants, e.g., those described above in reference to FIGS. 1A-1G and FIGS. 2A-2B.

In step 310, an optical element preform is placed into a compression mold. As described above in reference to FIGS. 1A-1G, the optical element preform includes an optical substrate having surfaces of optical quality (i.e., specular surfaces) and protective sheets disposed on either side of the optical substrate (between the compression mold and the optical surfaces of the optical substrate) to protect the optical surfaces of the substrate from damage during the compression molding process. In some examples, the optical element preform (substrate and/or protective sheet(s)) can be pre-heated before being placed into the mold while in other embodiments, the optical element preform can be heated after being inserted into the mold. For example, the mold itself may be heated using one or more heating elements that are disposed within the mold According to certain embodiments, the mold contact surfaces can be non-specular surfaces that are characterized by a surface roughness that is indicative of an unpolished surface. The precise value of the surface roughness of the mold contact surface is not critical because, as described above in reference to FIG. 1B, during compression, the protective sheets form buffer layers that protect the optical surfaces of the optical substrate and mitigate against transfer of the surface roughness of the mold contact surface onto the optical surface.

In step 320, the compression mold is closed thereby generating a deformed optical element from the optical element preform. The mechanism by which the portions of the compression mold are mechanically opened/closed is not critical and any method or system known in the art can be used without departing from the scope of the present disclosure.

In step 330, a compression force is applied to the deformed optical component and held for a period of time. As the compression force is being applied, heat may also be applied to the mold and/or the deformed optical component, e.g., using an oven, heater or the like. For example for an optical substrate formed from polycarbonate, having a size of 90 mm×100 mm×0.5 mm with a compressed mold of the type shown in FIGS. 2A-2B can be placed into an oven, with the temperature of the oven set to 160° C. Once the temperature of the oven stabilizes after insertion of the mold, the compressed mold can be held at 160° C. for 1 hour. As would be appreciated by one of ordinary skill in the art with the benefit of this disclosure, many different times and temperatures are possible depending on the types of materials chosen and the force of compression being used. However, to avoid damaging the optical surfaces of the optical substrate, the temperature of the optical element preform should not exceed the glass temperature of the material that forms the protective sheets. Furthermore, to provide for plastic deformation of the optical substrate, the temperature should be near the glass transition of the optical substrate. Accordingly, the material chosen for the protective sheets should have a higher glass transition temperature than the glass transition temperature of the optical substrate material. For example, in some embodiments, the glass transition temperature of the substrate layer can be within a range of 100° C. to 110° C. inclusive or 80° C. to 170° C. inclusive and the glass transition temperature of the protective layers can be between 140° C. to 150° C. inclusive. These ranges are provided merely for the sake of illustration and any types of materials with any glass transition range can be used without departing from the scope of the present disclosure.

In step 340, the compression force is released by opening the compression mold. In step 350, the deformed optical component is removed from the compression mold. According to certain embodiments, before releasing the compression force and removing the deformed optical component, the still compressed mold can be first cooled, e.g., under ambient room conditions or via water bath.

In step 360, just before the multi-bend optical element is deployed for use, or if the optical surfaces need to be exposed for further processing like add adding reflective coatings and the like, the protective sheet is removed from the deformed optical element. Advantageously, because the protective sheets served to protect the surfaces of the optical substrate, the optical surfaces of the deformed optical element remain specular even after being removed from the compression mold. For example, regardless of the surface roughness of the mold, the surface roughness of the bent optical element will have the same surface roughness of the unbent optical substrate. For example, if the surface roughness of the unbent optical substrate was between 0.1 nm and 5 nm RMS inclusive, e.g., 3 nm RMS, the surface roughness of the bend optical element will also be 3 nm RMS, even if the surface roughness of the mold contact surfaces was much larger than 3 nm RMS.

According to certain embodiments, rather than employing a two-sided compression molding technique to form a multi-bend optical element, a technique can be used that employs a one-sided vacuum mold as described in further detail below in reference to FIGS. 5-7.

Figure 4A:
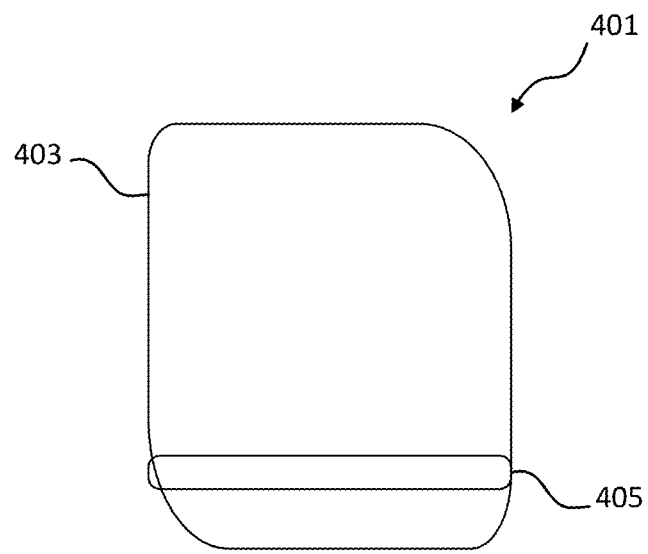
FIGS. 4A-4B illustrate a system for manufacture of thin, multi-bend optics by compression molding according to certain embodiments.
Figure 4B:
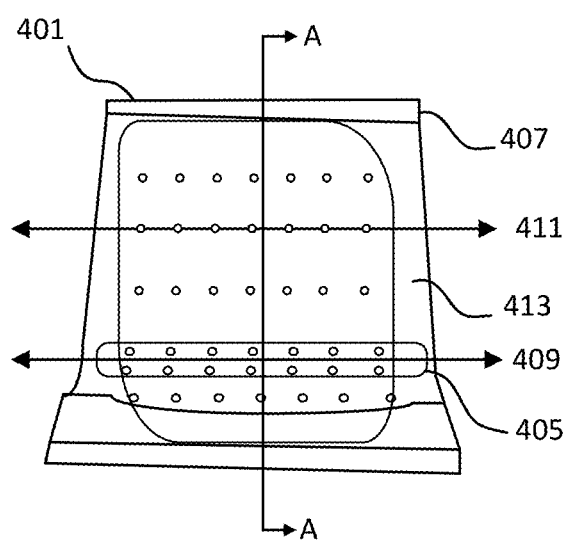

FIG. 4A shows one example of a pre-cut optical element preform 401 and FIG. 4B shows the pre-cut optical element preform 401 after being placed on a one-sided vacuum mold 407. The optical element preform 401 can be the same as the optical element preform described above in reference to FIG. 1, i.e., it includes an optical substrate and upper and lower protective sheets that may be bonded to the optical surfaces of the optical substrate for protection. The outer periphery 403 of optical element preform can be precut with prior knowledge of the desired shape of the periphery of the multi-bend optical element, i.e., the shape of the outer periphery 403 of the pre-cut optical element preform 401 is equivalent to a flat projection of the final periphery of the desired bent optical element. Prior to being placed on the vacuum mold 407 for bending, or alternatively while the pre-cut optical element preform 401 is resting on the vacuum mold 407 prior to being bent, a bend area 405 of the optical element preform can be heated, e.g., via an edge heater or the like. Heat can be applied to the bend area 405 until it softens enough to support a bending of the pre-cut optical element preform 401 in response to a bending force being applied to the pre-cut optical element preform 401, as described in further detail below in reference to FIGS. 5A-5C.

As shown in FIG. 4B, the vacuum mold 407 includes a collection of vacuum ports that pass through the body of the tool and terminate at an upper contact surface of the tool referred to herein as bend contact surface 413. The vacuum ports can be arranged in linear arrays, with several linear arrays being arranged laterally along the contact surface, where each linear array is disposed along a direction that is generally parallel to the bend axis 409. In the example shown, each linear array includes 7 vacuum ports that are arranged along array direction 411. While linear arrays of ports are shown in the example of FIG. 4B any number and/or geometric arrangement of ports (including arrays that are not parallel to the bend axis 409) can be employed without departing from the scope of the present disclosure.

Bent contact surface 413 has a shape determines the overall bent shape of the finished multi-bend optical element. In this example, the bent contract surface 413 follows a general V-shape such that when bent, the optical element preform will form a linear bend having a bend axis 409 that runs down the apex of the v-shaped contact surface, as can be better seen in FIGS. 5A-5C below. Like the compression mold surfaces described above in reference to FIGS. 1A-1G, bent contact surface 413 of vacuum mold 407 can be a rough, unpolished (i.e., non-specular) surface.

Figure 5A:
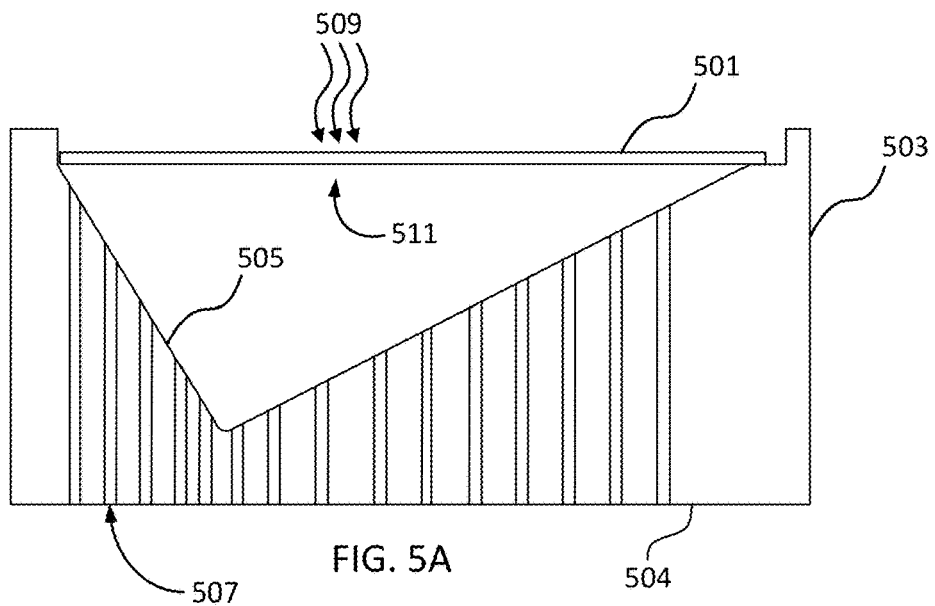
FIGS. 5A-5C illustrate a system for manufacture of thin, multi-bend optics by compression molding according to certain embodiments.
Figure 5B:
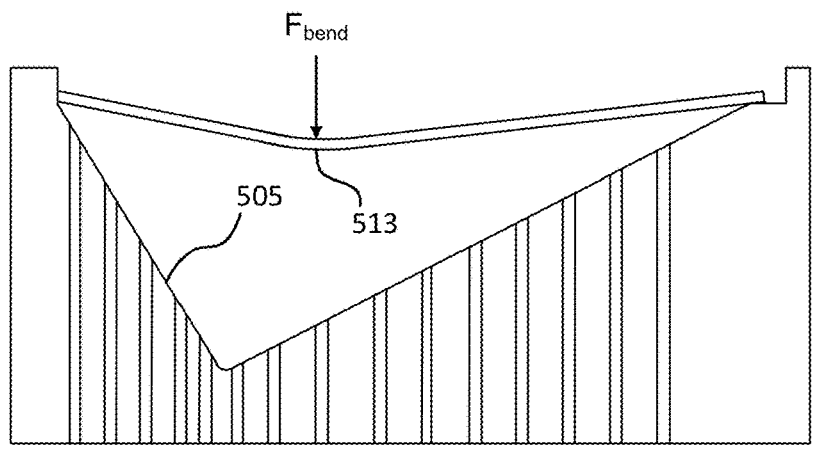
Figure 5C:
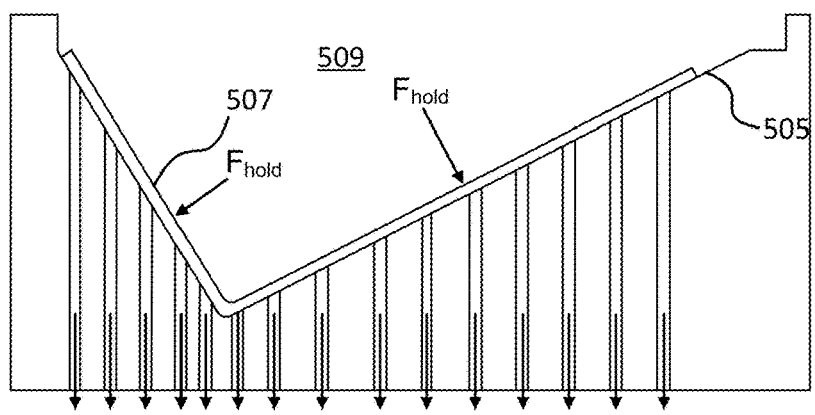

FIGS. 5A-5C show a cross section of a vacuum mold 503 that is similar a view of vacuum mold 407 taken along cut line A-A shown in FIG. 4B. FIG. 5A shows a starting position of the system with an unbent optical element preform 501 having its peripheral ends resting on an upper ledge/shelf of vacuum mold 503. To guide the bending process, vacuum mold 503 includes a bent contact surface 505. Distributed throughout the body of vacuum mold 503 are several vacuum ports, e.g., vacuum port 507. The outer ends of the vacuum ports that are located on the back surface 504 of vacuum mold 503 can be fluidly coupled to one or more vacuum pumps (not shown) such that air/gas can be drawn through the ports to create a vacuum-induced holding force as described in further detail below in reference to FIG. 5C. Before bending, heat 509 can be locally applied to the optical element preform 501 at bend region 511 to soften this region of the optical element preform 501 in preparation for bending.

FIG. 5B shows a pre-heated optical element preform 501 in the process of being bent by an applied bending force $F_{bend}$. The precise mechanism by which $F_{bend}$ is applied is not critical and any bending machine the employs any type of mechanical contact can be employed without departing from the scope of the present disclosure. As $F_{bend}$ is applied, the pre-heated optical element preform 501 begins to form a bend 513 at the pre-heated bending region 511. As $F_{bend}$ is applied further, the radius of curvature of the bend 513 decreases and the bottom surface of the optical element preform 501 moves closer to the bent contact surface 505. Eventually, the optical element preform 501 bends to such an extent that the bottom surface of the deformed optical element preform 501 contacts the contact surface 505 of the vacuum mold 503 as shown in FIG. 5C. At this stage, the shape of the bent optical element preform 501 follows the shape of the bent contact surface 505 thereby forming a bent optical element 507.

To hold the bent optical element against the bent contact surface, a vacuum can be established within the vacuum ports. For example, one or more vacuum pumps that are fluidly coupled to the vacuum ports can be used to draw gas out of the vacuum ports (the flow of gas is represented by downward arrows in FIG. 5C). The reduction in the gas pressure in the vacuum ports, relative to the gas pressure on the opposite side of the bent optical element, causes a vacuum-induced holding force $F_{hold}$ to be applied on the outer surface of the bent optical element 507. The bent optical element 507 is then held in place by $F_{hold}$ while the bend region cools. Once the deformed optical element 507 is sufficiently cooled such that the bend is mechanically stable, the gas pressure within the vacuum ports is increased such that $F_{hold}$ is effectively reduced to zero. Then, the deformed optical element 507 can be removed from the vacuum mold.

Like the deformed optical element described above in reference to FIG. 1, each optical surface of the optical substrate of the bend optical element 507 is protected by a corresponding protective sheet that is present during the heating, bending, and cooling process. The protective sheets may also be left in place after the deformed optical element 507 is removed to further protect the optical surfaces during storage or further processing.

For the sake of simplicity, FIGS. 5A-5C show an example of making a single bend in an optical element preform. However, as would be appreciated by one of ordinary skill in the art with the benefit of this disclosure, any number of bends can be made. In one example, the contact surface of the vacuum mold can include one or more bends such that it will induce corresponding bends in the optical element preform. For example the contact surface can be s-shaped, similar to the compression mold shape in FIG. 1. In addition, the process shown in FIGS. 5A-5C can be repeated several times with the same optical element preform being transferred to a different vacuum mold with a different bent contact surface after a bend is complete. Each vacuum mold can have a surface that is defined to make a specific type of bend in the optical element preform and thus, after the entire process is complete, the deformed optical element preform can have multiple bends.

Figure 6:
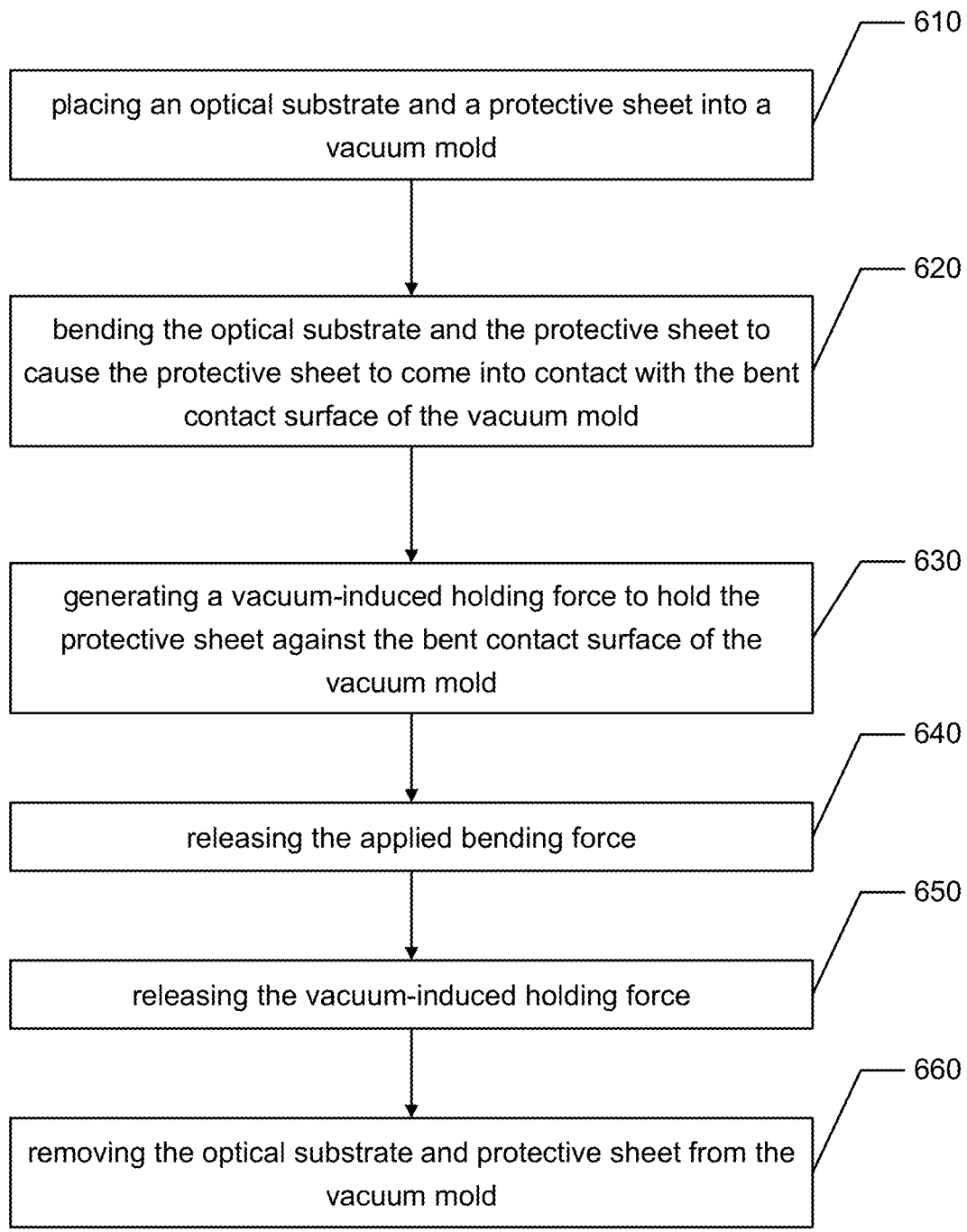
FIG. 6 illustrates a flow chart for a method of operating a head mounted display in accordance with one or more embodiments.

FIG. 6 illustrates a flow chart for a method of manufacturing thin, multi-bend optics by vacuum molding according to certain embodiments. The method can employ any of the vacuum molding systems described herein and their variants, e.g., those described above in reference to FIGS. 4A-4C and FIGS. 5A-5C.

In step 610, an optical substrate and a protective sheet are placed onto a vacuum mold. The optical substrate includes an optical surface and the protective sheet is disposed between the vacuum mold and the optical surface of the optical substrate. According to certain embodiments, the vacuum mold includes a bent contact surface that is characterized by a surface roughness (e.g., the bent contact surface can be a rough, unpolished, non-specular surface. A collection of vacuum ports pass through a body of the vacuum mold. One example of such a vacuum mold is described above in reference to FIGS. 5A-5C.

In some embodiments, the optical substrate and protective sheet are bonded and/or placed together to form an optical element preform and the preform is placed onto the vacuum mold. In some embodiments, the protective sheet can be placed into the vacuum mold first and then the optical substrate can be placed on top of the protective sheet.

In step 620, an applied bending force $F_{bend}$ is applied to the optical substrate and the protective sheet to cause the protective sheet to come into contact with the bent contact surface of the vacuum mold. The protective sheet can provide a buffer layer between the bent contact surface of the vacuum mold and the optical surface thereby mitigating against transfer of the surface roughness of the bent contact surface onto the optical surface. In some embodiments, before applying the applied bending force, heat can be locally applied to optical substrate and a protective sheet at one or more bend region(s) to soften the bend region(s) in preparation for bending. In some embodiments, the optical substrate can be heated via the vacuum mold itself, e.g., in a case where the vacuum mold includes one or more heating elements embedded within. In other embodiments, the entire process can take place within an oven such that both the vacuum mold and the optical substrate are heated via the oven. Any single hearing method or combination of the above-mentioned heating methods can be employed without departing from the scope of the present disclosure.

As described above in reference to the compression molding techniques, the to avoid damaging the optical surfaces of the optical substrate, the temperature of should not exceed the glass temperature of the material that forms the protective sheets. Furthermore, to provide for plastic deformation of the optical substrate, the temperature should be near the glass transition of the optical substrate. Accordingly, the material chosen for the protective sheets should have a higher glass transition temperature than the glass transition temperature of the optical substrate material. For example, in some embodiments, the glass transition temperature of the substrate layer can be within a range of 100° C. to 110° C. inclusive or 80° C. to 170° C. inclusive and the glass transition temperature of the protective layers can be between 140° C. to 150° C. inclusive. These ranges are provided merely for the sake of illustration and any types of materials with any glass transition range can be used without departing from the scope of the present disclosure.

In step 630, a vacuum-induced holding force $F_{hold}$ is generating to hold the protective sheet and optical substrate against the bent contact surface of the vacuum mold. As described above in reference to FIG. 5C, the vacuum-induced holding force can be caused by lowering a pressure within the vacuum ports that pass through the body of the vacuum mold.

In step 640, the applied bending force can be released while the vacuum-induced holding force $F_{hold}$ is held in place to hold the hold the protective sheet and optical substrate against the bent contact surface of the vacuum mold. $F_{hold}$ can be applied for a duration of time, referred to herein as the "holding time period." The holding time period can vary depending on the materials involved and also can vary depending on the initial temperature of the optical substrate and a protective sheet. According to certain embodiments, the holding time period can be a duration of time that allows for the optical substrate and a protective sheet to cool such that the one or more bend(s) induced in the heated optical substrate are set in place, i.e., the optical substrate is cooled to the point that it's shape will not substantially recoil or flatten when vacuum-induced holding force is removed and the optical substrate and a protective sheet are removed from the vacuum mold.

In step 650, the optical substrate and protective sheet are removed from the vacuum mold, as described above in reference to FIG. 5C.

Figure 7:
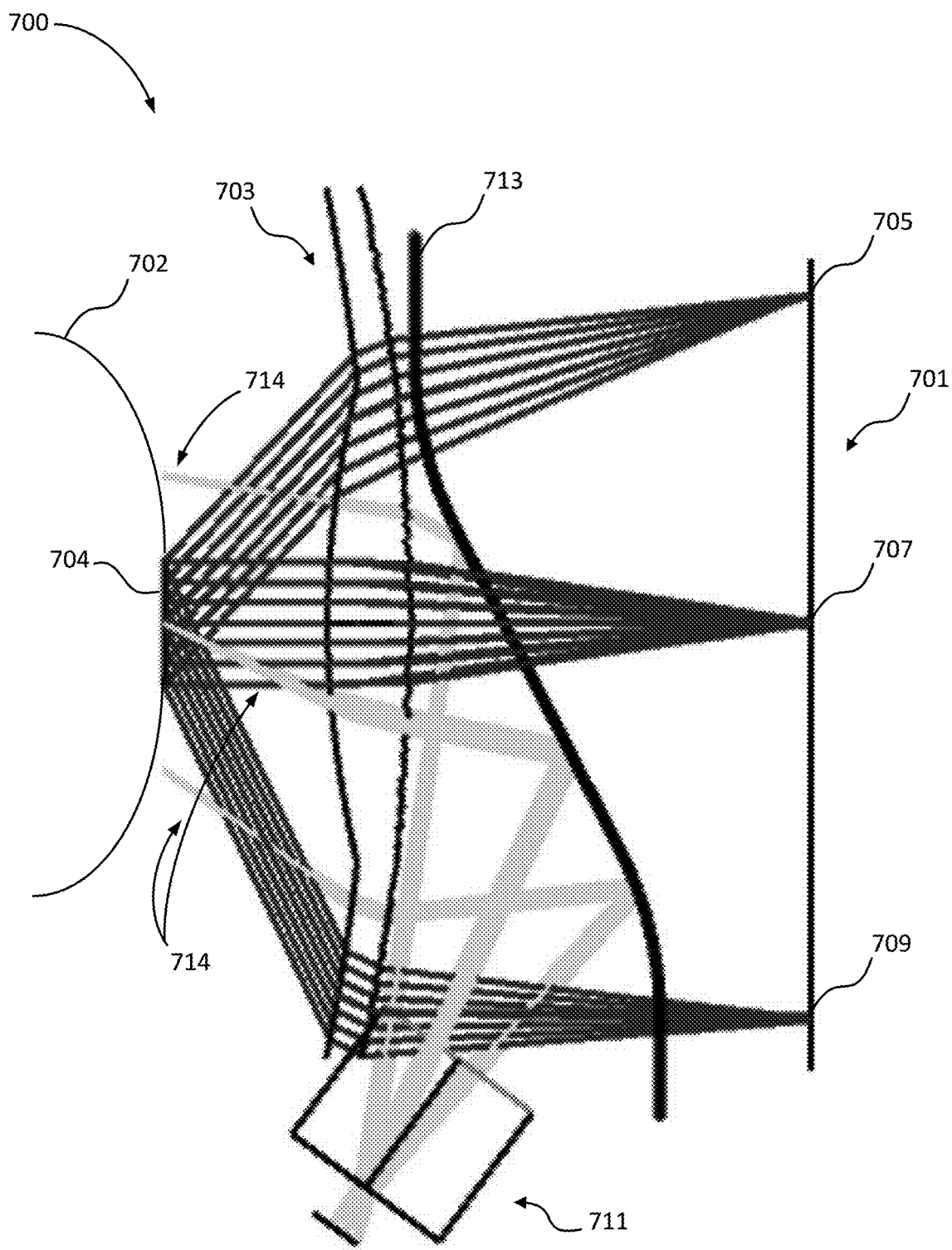
FIG. 7 illustrates an optical system that employs a multi-bend optical element according to certain embodiments.

FIG. 7 illustrates an optical system 700 that employs a multi-bend optical element according to certain embodiments. The optical system 700 can be employed within a VR/AR head mounted display system and, as such, is compactly arranged. The optical system includes a display 701 and lens system 703. According to certain embodiments, the lens system 703 can be designed to capture diverging cones of light rays that originate from one or more points on the display 701, e.g., rays emanating from points 705, 707, and 709, and to collimate the diverging rays. The collimated rays are then redirected by the lens system 703 to pupil 704

(that can be, e.g., a pupil of a user's eye 702). Accordingly, one optical effect of lens system 703 is to make display 701 seem much farther away from the perspective of the user's visual perception. Generally, to minimize the overall size of the optical system 700, it is desirable for the overall distance between the user's eye 702 and display 701 to be minimized. However, competing the constraint to keep the system compact is the desire to have more complex optical systems placed within head mounted display system. For example, FIG. 7 shows an eye-tracking system that is arranged within the optical system 700. The eye tracking system can include an infrared (IR) light source (not shown) and a camera system 711. To avoid blocking the field of view of the user's eye 702, the camera 711 can be placed opposite the display 701, on the same side of the lens system 703 as the user's eye 702, at a lateral position that is displaced from the eye, as shown. In order to capture the IR eye tracking light 714 that is reflected from the eye, a semi-reflective optical element, such as partially reflective mirror 713 are placed between the optical system 703 and the display 701. Partially reflective mirror 713 can be a dichroic mirror that is highly reflective for infra-red (IR) light while at the same time being highly transparent for visible display light. According to certain embodiments, partially reflective mirror 713 mirror can be a thin multi-bend optical element that is formed according to the methods disclosed herein.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In the description and figures disclosed herein, specific details are set forth for the purposes of explanation and in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples with unnecessary detail. As such, the figures and description are not intended to be restrictive or limiting. The terms and expressions that have been employed in this disclosure are used as terms of description and not of limitation, and there is no intention in the use of such terms and expressions of excluding any equivalents of the features shown and described or portions thereof.

Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    placing an optical substrate and a protective sheet laminated on the optical substrate into a compression mold and between a rigid upper portion and a rigid lower portion of the compression mold, wherein:
        the optical substrate includes an optical surface;
        the protective sheet is disposed between the compression mold and the optical surface of the optical substrate; and
        the compression mold includes a mold contact surface that is characterized by a surface roughness;
    closing the compression mold to deform the optical substrate and to deform the protective sheet to conform to the mold contact surface;
    holding the compression mold in a closed position for a compression time period, wherein during the compression time period, the protective sheet contacts the mold contact surface and provides a buffer layer between the mold contact surface and the optical surface thereby mitigating against transfer of the surface roughness of the mold contact surface onto the optical surface;
    opening the compression mold;
    removing the optical substrate and the protective sheet from the compression mold;
    separating the optical substrate from the protective sheet after removal from the compression mold; and
    depositing, before placing the optical substrate and the protective sheet into the compression mold or after separating the optical substrate from the protective sheet, an optical coating layer that is reflective for infrared light and transparent for visible light on the optical substrate,
    wherein the deformed optical substrate with the optical coating layer deposited thereon is characterized by a multi-bend shape comprising (1) a first bend region having a first end, a second end, and a first radius of curvature of a first sign and (2) a second bend region having a first end, a second end, and a second radius of curvature of a second sign opposite the first sign,
    wherein the first end of the first bend region corresponds to a first distal end of the deformed optical substrate with the optical coating layer deposited thereon, and the second end of the second bend region corresponds to a second distal end of the deformed optical substrate with the optical coating layer deposited thereon, and
    wherein two or more different portions of the deformed optical substrate with the optical coating layer deposited thereon are configured to (1) reflect infrared light from different directions toward a light capturing device and (2) transmit visible light.

2. The method of claim 1, wherein the mold contact surface is a non-specular surface and the optical surface of the optical substrate after being removed from the compression mold is a specular surface.

3. The method of claim 1, wherein a surface roughness of the optical surface of the optical substrate after being removed from the compression mold is less than 5 nm RMS.

4. The method of claim 1, further comprising pre-heating the optical substrate before placing it in the compression mold.

5. The method of claim 1, further comprising indirectly heating the optical substrate by heating the compression mold.

6. The method of claim 1, wherein a glass transition temperature of the optical substrate is lower than a glass transition temperature of the protective sheet.

7. The method of claim 1, wherein a glass transition temperature of the optical substrate is within a range of 100° C. to 110° C. and a glass transition temperature of the protective sheet is between 140° C. to 150° C.

8. The method of claim 1, wherein a glass transition temperature of the optical substrate is within a range of 80° C. to 170° C.

9. The method of claim 1, wherein the mold contact surface is characterized by an S-shaped surface.

* * * * *